(12) United States Patent
Ahmed

(10) Patent No.: US 12,387,490 B2
(45) Date of Patent: Aug. 12, 2025

(54) METHODS, SYSTEMS, AND MEDIA FOR IDENTIFYING HUMAN COACTIVITY IN IMAGES AND VIDEOS USING NEURAL NETWORKS

(71) Applicant: Walid Mohamed Aly Ahmed, Mississauga (CA)

(72) Inventor: Walid Mohamed Aly Ahmed, Mississauga (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 460 days.

(21) Appl. No.: 17/665,458

(22) Filed: Feb. 4, 2022

(65) Prior Publication Data

US 2023/0252784 A1 Aug. 10, 2023

(51) Int. Cl.
| | |
|---|---|
| *G06V 20/40* | (2022.01) |
| *G06T 7/73* | (2017.01) |
| *G06T 9/00* | (2006.01) |
| *G06V 10/82* | (2022.01) |
| *G06V 40/10* | (2022.01) |

(52) U.S. Cl.
CPC ............... *G06V 20/41* (2022.01); *G06T 7/73* (2017.01); *G06T 9/002* (2013.01); *G06V 10/82* (2022.01); *G06V 40/10* (2022.01); *G06T 2200/04* (2013.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | |
|---|---|---|
| 7,330,566 B2 | 2/2008 | Cuttler |
| 8,792,722 B2 | 7/2014 | Liu et al. |
| 8,928,816 B2 | 1/2015 | Fahn et al. |
| 9,278,255 B2 | 3/2016 | Cheng |

(Continued)

FOREIGN PATENT DOCUMENTS

| | | |
|---|---|---|
| CN | 111563480 A | 8/2020 |
| CN | 113011381 A | 6/2021 |

OTHER PUBLICATIONS

Group-Skeleton-Based Human Action Recognition in Complex Events, by Li et al., Grand Challenge: Human Centric Analysis II MM '20, Oct. 12-16, 2020, Seattle, WA, USA (Year: 2020).*

(Continued)

*Primary Examiner* — Vikkram Bali

(57) ABSTRACT

Methods, systems and processor-readable media for classifying human coactivity performed jointly by two humans shown in an image or a sequence of frames of a video. A 2D convolutional neural network is used to identify key points on the human body, such as human body joints, visible within the image or within each frame, for each of the two people performing the coactivity. An encoded representation of the key points is created for each image or frame, the encoded representation being based on distances between the key points of the first person and key points of the second person. The encoded representation for the image, or a concatenated volume of the encoded representations of the frames, is processed by a fully-connected neural network trained to classify the coactivity.

20 Claims, 11 Drawing Sheets

(56) References Cited

U.S. PATENT DOCUMENTS

2019/0294871 A1* 9/2019 Vaezi Joze ........... G06V 40/103
2022/0383639 A1* 12/2022 Javan Roshtkhari .. G06V 20/42

OTHER PUBLICATIONS

S. Ji, W. Xu, M. Yang and K. Yu, "3D Convolutional Neural Networks for Human Action Recognition," in IEEE Transactions on Pattern Analysis and Machine Intelligence, vol. 35, No. Jan. 1, 2013.

* cited by examiner

METHODS, SYSTEMS, AND MEDIA FOR IDENTIFYING HUMAN COACTIVITY IN IMAGES AND VIDEOS USING NEURAL NETWORKS

RELATED APPLICATION DATA

This is the first patent application related to this matter.

TECHNICAL FIELD

The present disclosure relates to human body tracking in a digital video, and in particular to methods, systems, and processor readable media for identifying a coactivity of two human bodies in an image or a digital video.

BACKGROUND

Recognizing human behavior is a longstanding problem in computer vision research. While machine learning has resulted in advances in the realm of computer vision, including a range of approaches to identifying humans in digital images or digital videos, and for tracking the movement of human bodies over multiple frames of a digital video, the recognition or identification of specific types of human behavior in a digital video remains difficult.

Most existing approaches to human behavior recognition attempt to classify activities performed by a single person, such as walking, jogging, and jumping. Many such existing approaches use machine learning to train neural networks to perform 3D convolution operations: one such example is described by S. Ji, W. Xu, M. Yang and K. Yu, "3D Convolutional Neural Networks for Human Action Recognition," in IEEE Transactions on Pattern Analysis and Machine Intelligence, vol. 35, no. 1, pp. 221-231, January 2013, doi: 10.1109/TPAMI.2012.59. Such 3D convolution-based approaches are limited to classification of activities performed by a single person in isolation.

However, many activities are performed by more than one person, such that the interaction between two or more people is what defines the activity. Examples of two-person activities, also referred to herein as "coactivities", include partner dance or a foul play in a soccer match. The information necessary to identify or classify such coactivities is unusable by the existing approaches to identification of single-person activities described above, and those existing approaches are incapable of classifying coactivities that are defined by the interaction of two or more human bodies instead of by independent action by each of two or more human bodies.

Accordingly, it would be desirable to provide a method for classifying coactivity by two or more human bodies visible in an image or a time series of images (e.g., a sequence of video frames).

SUMMARY

The present disclosure provides methods, systems, and processor readable media for identifying a coactivity of two human bodies in an image or a digital video. Each image (e.g., each video frame) is processed to extract key point data, each key point corresponding to a predefined key point on a human body visible in the image: e.g., a set of 18 key points may be extracted for each visible human body, each of the 18 key points corresponding to a predefined location on the body, such as the left knee, the right eye, and so on. A first key point position set is generated, representative of the position of each key point of a first person. A second key point position set is generated, representative of the position of each key point of a second person. Optionally, one or more key points of an object visible in the image may also be extracted, along with its position.

An encoded representation of the image is generated by measuring a respective 2D or 3D distance from each key point of the first human body to each key point of the second human body. In the example above in which each body has 18 key points, the encoded representation includes (18*18) =324 distance values. Optionally, the encoded representation may also include a distance from one or more key points of each human body to the key point(s) of the object. In the case of video data (i.e. a plurality of images), the encoded representation of each image (i.e., each video frame) may be concatenated into a 3D data volume of size (18*18*n), wherein n is the number of video frames.

The encoded representation of the image(s) is provided to a coactivity classifier to generate classification information representative of a coactivity identified in the image(s). The coactivity classifier may include a model, such as a fully-connected neural network, trained using machine learning to classify coactivity based on encoded representations of images.

In at least some aspects, the disclosure relates to a method. For each image of one or more images, a number of steps are performed. A first key point position set and a second key point position set for the image are obtained. The first key point position set includes a key point position for each key point of a plurality of key points of a first human body detected in the image, and the second key point position set includes a key point position for each key point of a plurality of key points of a second human body detected in the image. The first key point position set and the second key point position set are processed to determine a distance between each key point position of the first key point position set and each key point position of the second key point position set. The distances between each key point position of the first key point position set and each key point position of the second key point position set are processed to generate an encoded representation of the image. The encoded representations of each image of the one or more images are provided to a coactivity classifier that includes a machine learned model that is configured to classify a coactivity of two human bodies. Classification information is generated, using the coactivity classifier, classifying a coactivity performed by the first human body and second human body in the one or more images.

In at least some aspects, the disclosure relates to a system, comprising a processor and a memory having stored thereon executable instructions. The executable instructions, when executed by the processor, cause the system to perform a number of operations. For each image of one or more images, a number of steps are performed. A first key point position set and a second key point position set for the image are obtained. The first key point position set includes a key point position for each key point of a plurality of key points of a first human body detected in the image, and the second key point position set includes a key point position for each key point of a plurality of key points of a second human body detected in the image. The first key point position set and the second key point position set are processed to determine a distance between each key point position of the first key point position set and each key point position of the second key point position set. The distances between each key point position of the first key point position set and each key point position of the second key point position set are processed to generate an encoded representation of the image. The encoded representations of each image of the one or more images are provided to a coactivity classifier that includes a machine learned model that is configured to classify a coactivity of two human bodies. Classification information is generated, using the coactivity classifier, classifying a coactivity performed by the first human body and second human body in the one or more images.

In at least some aspects, the disclosure relates to a non-transitory processor-readable medium containing instructions which, when executed by a processor of a system, cause the system to perform a number of operations. For each image of one or more images, a number of steps are performed. A first key point position set and a second key point position set for the image are obtained. The first key point position set includes a key point position for each key point of a plurality of key points of a first human body detected in the image, and the second key point position set includes a key point position for each key point of a plurality of key points of a second human body detected in the image. The first key point position set and the second key point position set are processed to determine a distance between each key point position of the first key point position set and each key point position of the second key point position set. The distances between each key point position of the first key point position set and each key point position of the second key point position set are processed to generate an encoded representation of the image. The encoded representations of each image of the one or more images are provided to a coactivity classifier that includes a machine learned model that is configured to classify a coactivity of two human bodies. Classification information is generated, using the coactivity classifier, classifying a coactivity performed by the first human body and second human body in the one or more images.

In some examples, the one or more images comprises a plurality of frames of a video. Providing the encoded representation of each image of the one or more images to the coactivity classifier comprises concatenating the encoded representations of the plurality of frames to generate a three-dimensional (3D) data volume, and providing the 3D data volume as input to the coactivity classifier.

In some examples, the one or more images comprises a single image. The encoded representation of each image of the one or more images comprises a vector of values. Each value is based on the distance between each key point position of the first key point position set and each key point position of the second key point position set.

In some examples, each key point position is a two-dimensional (2D) position within a plane of the respective image, and each distance is a 2D distance within an image plane of the respective image.

In some examples, each key point position is a three-dimensional (3D) position representative of a location of the respective key point in 3D space, and each distance is a 3D distance.

In some examples, further steps are performed for each image of the one or more images. An object key point position for the image is obtained. The object key point position is representative of a position of a key point of an object detected in the image. The first key point position set and the object key point position are processed to determine a distance between each at least one key point position of the first key point position set and the object key point position, and the second key point position set and the object key point position are processed to determine a distance between each at least one key point position of the second key point position set and the object key point position. For each image of the one or more images, the encoded representation of the image is further generated by processing the distance between each at least one key point position of the first key point position set and the object key point position, and the distance between each at least one key point position of the second key point position set and the object key point position.

In some examples, obtaining the first key point position set and the second key point position set for the image comprises generating the first key point position set and the second key point position set using a pose estimation model. The pose estimation model is configured to perform a number of steps. The pose estimation model receives a first bounding box for the first human body, comprising one or more pixel values of a first plurality of pixels of the respective image. The pose estimation model receives a second bounding box for the second human body, comprising one or more pixel values of a second plurality of pixels of the respective image. The pose estimation model processes the first bounding box to generate the key point position for each key point of the plurality of key points of the first human body within the first bounding box, and processes the second bounding box to generate the key point position for each key point of the plurality of key points of the second human body within the second bounding box.

In some examples, the machine learned model comprises a fully-connected neural network.

In some examples, at least one key point position of the first key point position set corresponds to a joint of the first human body, and at least one key point position of the second key point position set corresponds to a joint of the second human body.

In some examples, the encoded representation of each respective image comprises a vector comprising a plurality of distance values. The plurality of distance values comprises the distance between each key point position of the first key point position set and each key point position of the second key point position set of the respective image.

BRIEF DESCRIPTION OF THE DRAWINGS

Embodiments will now be described by way of examples with reference to the accompanying drawings, in which like reference numerals may be used to indicate similar features.

DESCRIPTION OF EXAMPLE EMBODIMENTS

Figure 1A:
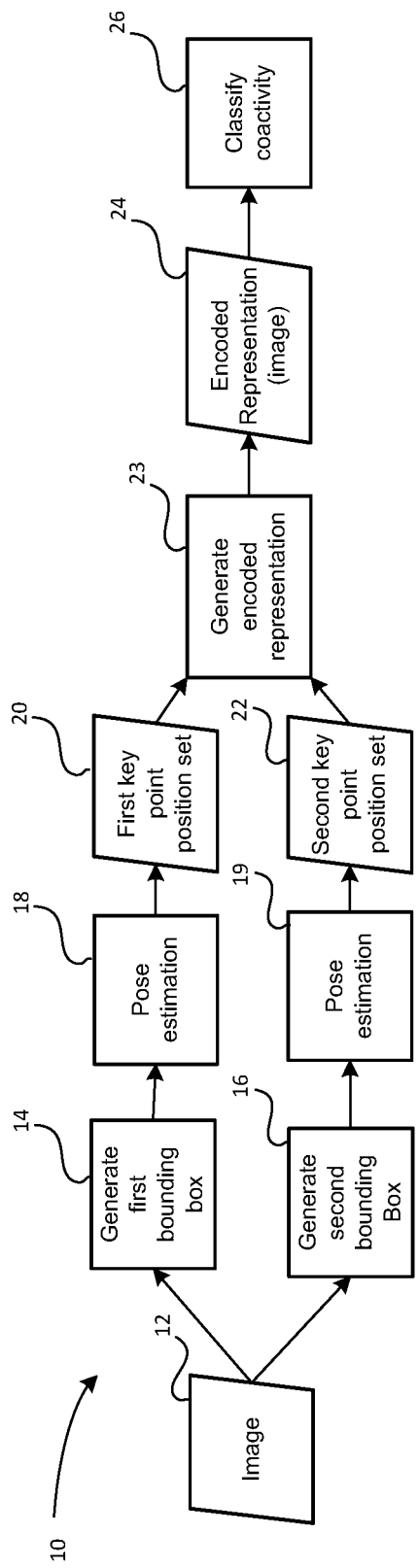
FIG. 1A is a schematic diagram showing operations of a first example system for identifying human coactivity in a single image, according to example embodiments described herein.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Example embodiments will now be described with respect to methods, systems, and non-transitory media for identifying a coactivity of two human bodies in an image or a digital video.

FIG. 1A is a schematic diagram showing the operations of a first example system 10 for classification of human coactivity in a single image 12.

In some embodiments, the image 12 is a two-dimensional (2D) image that includes a corresponding RGB (red, green, and blue) value for each pixel in the 2D image. The pixel color values may be mapped to a 2D x-y coordinate system wherein x is a horizontal pixel position beginning at 0 at the left edge of the image and increasing toward the right edge, and y is a vertical pixel position beginning at 0 at the top edge of the image and increasing toward the bottom edge. In some embodiments, the image 12 includes a corresponding RGB (red, green, and blue) value for each pixel in the image 12 as well as a depth (z) value for each pixel in the image 12, wherein the depth value indicates a pixel position beginning at 0 at the position of the camera used to capture the image and increasing away from the camera into the scene. A camera having depth-finding capabilities may capture the image 12 and generate the depth (z) value for each pixel in the image 12. Alternatively, pre-processing of the image 12 may be performed to extract a depth value for each pixel corresponding to a human detected in the image 12.

Example embodiments will be described below with reference to 2D images without depth information, in which the position of a key point extracted from the image 12 is a 2D position (e.g., x and y pixel coordinates), and in which a distance between two key points is a 2D distance within the image plane of the image (e.g., within the 2D pixel space of the image defined by x and y pixel coordinates). However, it will be appreciated that embodiments using depth information as part of the image 12 may represent key point positions as 3D positions (e.g., an x pixel coordinate, a y pixel coordinate, and a z depth value for each key point), and may calculate and represent a distance between two key points as a 3D distance.

The system 10 begins by processing the image 12 at a first bounding box generation block 14 to generate a first bounding box corresponding to a first human body visible in the image 12, and processing the image 12 at a second bounding box generation block 16 to generate a second bounding box corresponding to a second human body visible in the image 12. Each bounding box may substantially surround all or part of its respective human body. An example bounding box generated in association with a human body detected in an image is described with reference to FIG. 4A below. Bounding box generation based on object detection, and specifically based on detection of human bodies, is a well known problem in computer vision, and any suitable bounding box generation technique may be used by first bounding box generation block 14 and second bounding box generation block 16. It will be appreciated that first bounding box generation block 14 and second bounding box generation block 16 may both be implemented by the same logic in some embodiments, e.g., a single convolutional neural network trained to perform object detection using reinforcement learning.

The first bounding box, and optionally the image 12, are processed by a first pose estimation block 18 to generate the first key point position set 20. The second bounding box, and optionally the image 12, are processed by a second pose estimation block 19 to generate the second key point position set 22. It will be appreciated that first pose estimation block 18 and second pose estimation block 19 may both be implemented by the same logic in some embodiments. In some embodiments, the first pose estimation block 18 and second pose estimation block 19 are implemented by a two-dimensional (2D) convolutional neural network (CNN) that has been trained to identify key points in images as described in further detail below. The trained 2D CNN performs feature extraction to identify a set of key points for a respective human body detected in the image 12, as indicated by the respective bounding box generated in association with the respective human body. The trained 2D CNN may be a trained body tracking or pose estimation CNN. An example of a trained pose estimation CNN is described by Alexander Toshev and Christian Szegedy in DeepPose: *Human Pose Estimation via Deep Neural Networks*, arXiv:1312.4659, https://arxiv.org/abs/1312.4659, which is hereby incorporated by reference as if reproduced in their entirety. Another example of a trained pose estimation CNN is described in Zhe Cao, Gines Hidalgo, Tomas Simon, Shih-En Wei, and Yaser Sheikh in *OpenPose: Real-time Multi-Person 2D Pose Estimation using Part Affinity Fields*, arXiv: 1812.08008, http://arxiv.org/abs/1812.08008, which is also hereby incorporated by reference as if reproduced in their entirety.

Each key point corresponds to a position of a pixel in the image 12. Each key point includes a horizontal coordinate (x) and vertical coordinate (y) for the position of the pixel in the image 12 that has been identified as a key point. As described above, embodiments making use of depth data may also include a depth coordinate (z) for the position of the pixel in the image 12 that has been identified as a key point.

In some embodiments, the key points correspond to the positions in the frame of various joints or other locations on a human (such as eyes, ears, nose, and neck) detected and tracked in the image 12. An example configuration of correspondences between key points and locations on a human body is described below with reference to FIG. 4B.

The first key point position set 20 is representative of the position of each key point of the first human body in the image 12, and the second key point position set 22 is representative of the position of each key point of the second human body in the image 12. An encoded representation generation block 23 processes the first key point position set 20 and second key point position set 22 to generate an encoded representation 24 of the image 12. The encoded representation 24 is generated and encoded as described with reference to FIG. 6 below. In some embodiments, the encoded representation 24 is generated by computing a distance value between each key point of the first person (i.e. the first key point position set 20) and each key point of the second person (i.e. the second key point position set 22). The distance value may be computed as a 2D distance for images having key points defined in a 2D coordinate space as described above, as a 3D distance for images having key points defined in a 3D coordinate space as described above, or as another type of distance value representative of a distance between a given pair of key points. In some embodiments, the encoded representation 24 may omit distance values for one or more of the key points: for example, only key points corresponding to joints of the human body may be used to compute distance values in some embodiments (such as embodiments configured to classify coactivities that do not involve user's faces).

Finally, the encoded representation 24 of the image 12 is processed by a coactivity classifier 26 to generate classification information, as described in greater detail below with reference to FIG. 2A.

Figure 1B:
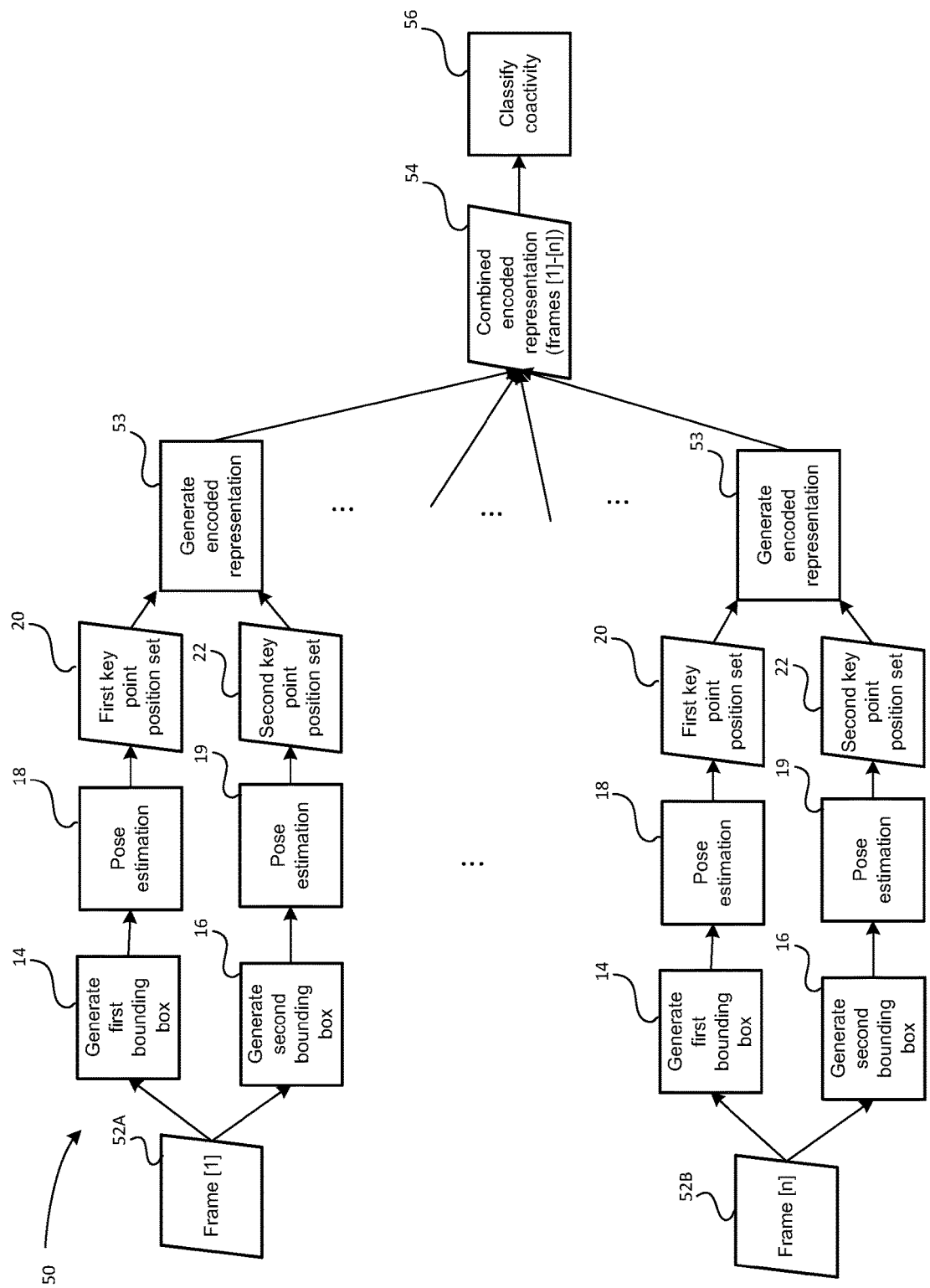
FIG. 1B is a schematic diagram showing operations of a second example system for identifying human coactivity in a sequence of video frames, according to example embodiments described herein.

FIG. 1B is a schematic diagram showing the operations of a second example system 50 for classification of human coactivity in a sequence of video frames (shown as frame [1] 52A through frame [n] 52B). The second example system 50 processes each frame 52A through 52B using the same functional blocks 14, 16, 18, 19 to generate a first key point position set 20 and second key point position set 22 for each frame. However, the encoded representation generation block 53 of the second example system 50 may differ from the encoded representation generation block 23 of the first example system 10 insofar as each encoded representation generation block 53 operates to concatenate or otherwise combine the encoded representations of the sequence of frames 52A through 52B into a combined encoded representation 54 of frames [1] through [n], as described in greater detail below with reference to FIG. 2B. The coactivity classifier 56 of the second example system 50 is configured to receive the combined encoded representation 54 as input and to classify coactivity shown in the sequence of frames 52A through 52B, as represented by the combined encoded representation 54, instead of classifying coactivity shown in a single image as represented by the encoded representation 24 of FIG. 1A.

Figure 2A:
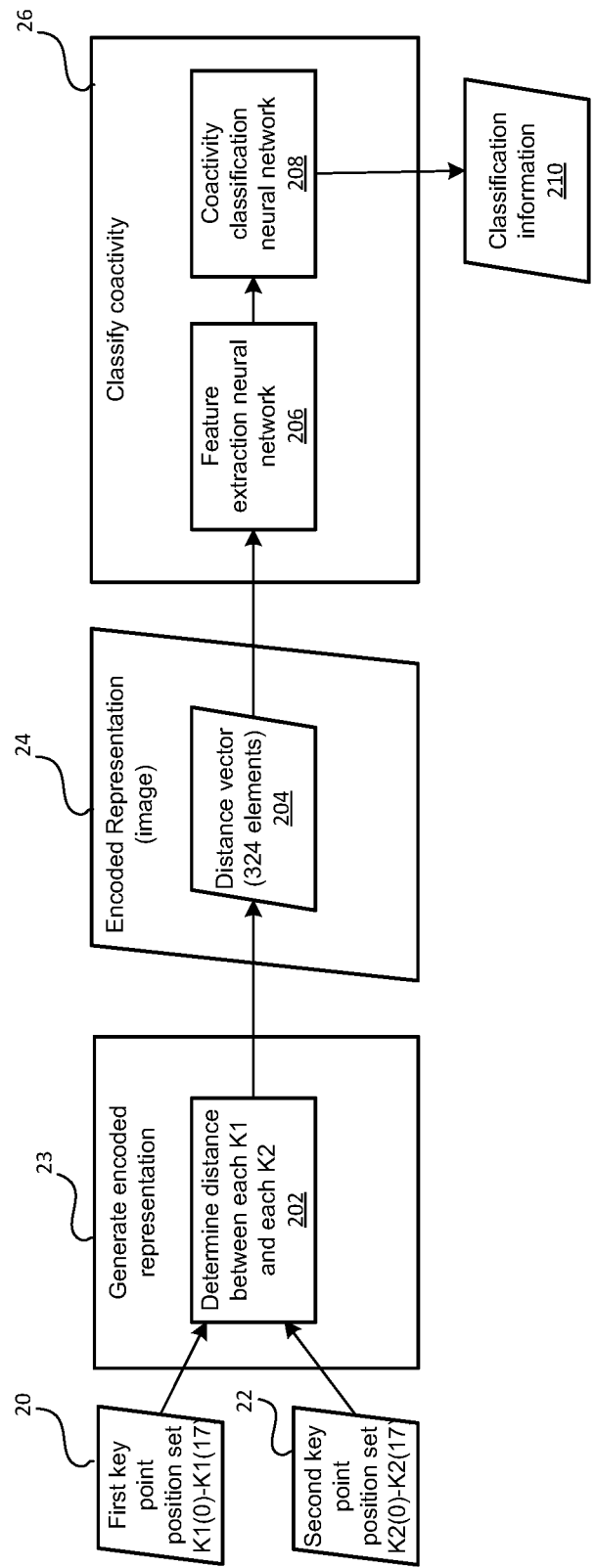
FIG. 2A is a schematic diagram showing further details of the encoded representation generation and coactivity classification blocks of the first example system of FIG. 1A.

FIG. 2A is a schematic diagram showing further details of example encoded representation generation 23 and coactivity classification 26 operations of the first example system 10. In this example, the first key point position set 20 includes 18 key point positions, denoted as key point positions K1(0) through K1(17): for example, the set of key points identified for each human body in the image 12 may be the 18 key points described below with reference to FIG. 4B. Similarly, the second key point position set 21 includes 18 key point positions, denoted as key point positions K2(0) through K2(17).

In this example, the encoded representation generation block 23 generates the encoded representation 24 of the image 12 by computing a distance between each K1 and each K2 (i.e., between each key point position K1 of the first key point position set 20 and each key point position K2 of the second key point position set 22), shown as distance computation operation 202. The distance between two key point positions in a 2D space may be computed as distance (K1, K2)=$\sqrt{(x_2-x_1)^2+(y_2-y_1)^2}$ wherein K1=$(x_1,y_1)$ and K2=$(x_2, y_2)$. Similarly, the distance between two key point positions in a 3D space may be computed as distance(K1, K2)=$\sqrt{(x_2-x_1)^2+(y_2-y_1)^2+(z_2-z_1)^2}$ wherein K1=$(x_1, y_1, z_1)$ and K2=$(x_2, y_2, z_2)$.

The distance computation operation 202 generates a set of distance values, wherein the number of distance values in the set is equal to the square of the number of key points of a human body: in this example, using 18 key points per human body, the number of distance values in the set is (18*18)=324 distance values. The 324 distance values may be encoded as a 324-element distance vector 204. The encoded representation 24 of the image 12 may include the distance vector 204, by itself or in combination with other information.

The coactivity classifier 26 in this example includes a feature extraction neural network 206 and a coactivity classification neural network 208. These two neural networks 206, 208 interact to implement a model, trained using machine learning, for classifying coactivity based on the encoded representation 24. First, the feature extraction neural network 206 processes the encoded representation 24 as input, propagating the encoded representation 24 forward through one or more layers of the feature extraction neural network 206 to generate a set of one or more feature maps or activation maps as output. The output of the feature extraction neural network 206 is then processed by the coactivity classification neural network 208 to generate classification information 210 classifying a coactivity performed by the first human body and the second human body in the image 12.

In some embodiments, the feature extraction neural network 206 is a fully-connected neural network, and the coactivity classification neural network 208 is a single neural network output layer including a softmax function for normalizing a set of logits generated by the neural network output layer to generate the classification information 210 as a probability distribution across a set of coactivity classes. In some embodiments, the coactivity class predicted with the highest probability in the normalized probability distribution may be used as the final output of the system 10.

The set of coactivity classes may be defined based on the intended problem domain: for example, a system configured to identify foul plays from images of soccer games may use the set of coactivity classes {"foul", "not foul"}, whereas a system configured to identify types of partner dance from images of ballroom dancing may use the set of coactivity classes {"tango", "salsa", "rumba", "waltz", "foxtrot", "not dancing"}. In some embodiments, the feature extraction neural network 206 and coactivity classification neural network 208 are jointly trained, using reinforcement learning, with a training dataset containing images labelled with one of the coactivity classes in the set.

Figure 2B:
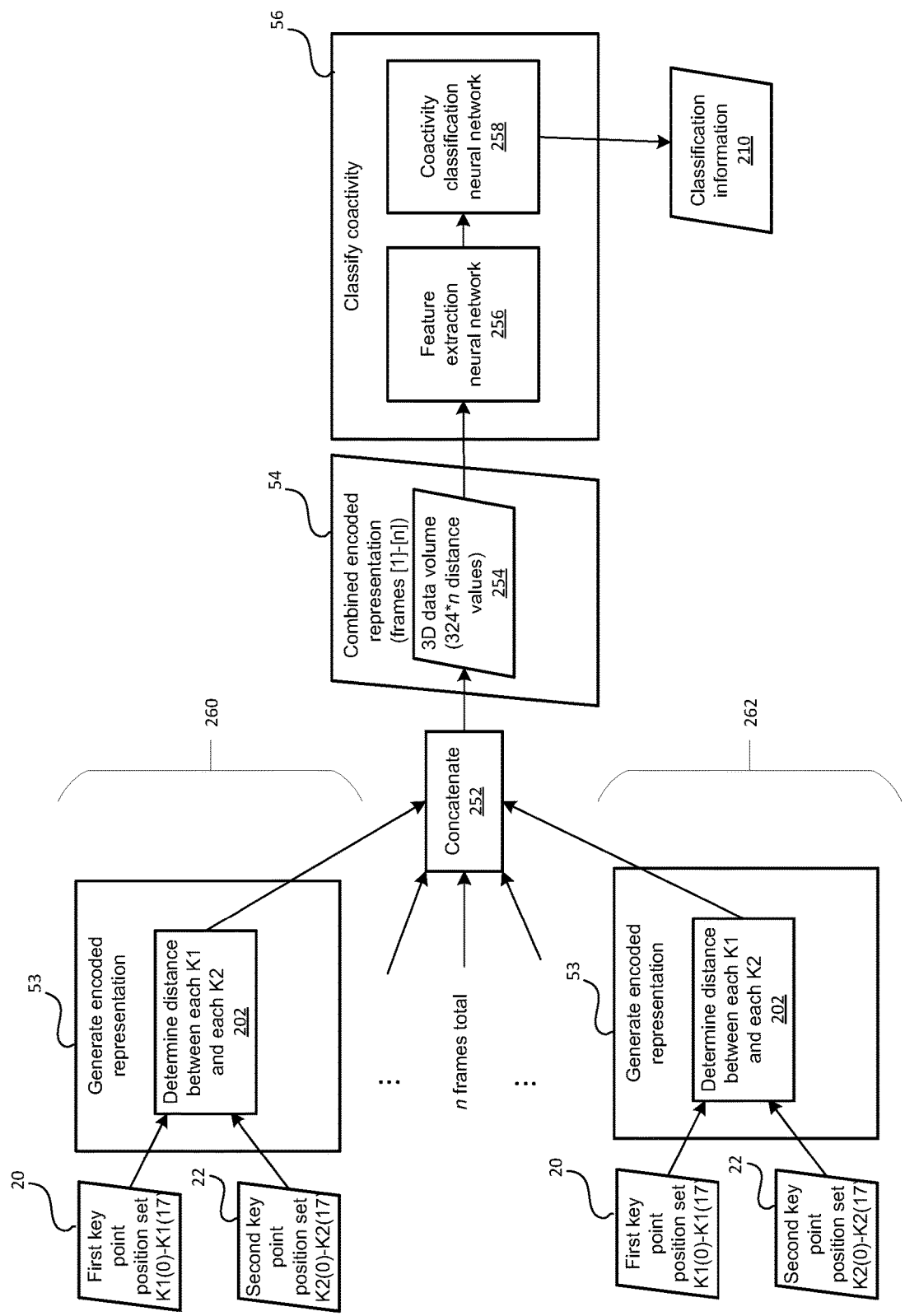
FIG. 2B is a schematic diagram showing further details of the encoded representation generation and coactivity classification blocks of the second example system of FIG. 1B.

FIG. 2B is a schematic diagram showing further details of example encoded representation generation 53 and coactivity classification 56 operations of the second example system 50. The pair of key point positions sets 20, 22 for each image (i.e. each frame in the sequence of frames [1] 52A through [n] 52B) is processed by the encoded representation generation block 53 by performing the same distance computation operation 202 as in FIG. 2A. However, each encoded representation generation block 53 (or each iteration of the encoded representation generation block 53 applied to a separate frame) provides the output of the distance computation operation 202 to a concatenation block 252. The concatenation block 252 concatenates the n distance vectors corresponding to the n frames 52A through 52B to generate a 3D data volume 254 of dimensions (# of key points in first key point position set*# of key points in second key point position set*n), i.e., in this example, (18*18*n)=(324*n) distance values.

The 3D data volume 254 is then provided as input to the coactivity classifier 56. In some embodiments, the 3D data volume 254 is flattened into a linear vector of (324*n) elements before being processed by the coactivity classifier 56. As in the coactivity classifier 26 of FIG. 2A, the coactivity classifier 56 includes a feature extraction neural network 256 and a coactivity classification neural network 258; in the multi-frame context of FIG. 2B, these networks 256, 258 are trained and configured to classify coactivities being performed by two human bodies over a sequence of n video frames, using a training data set containing labelled video clips of n frames each.

In some embodiments, the feature extraction neural network 256 is a convolution neural network configured to generate as output a final feature vector of 256 elements. The final feature vector is provided as input to the coactivity classification neural network 258. In some embodiments, the coactivity classification neural network 258 is a fully-connected neural network that has a final output layer for classifying the coactivity using a softmax function, as described above with reference to the final layer of the coactivity classification neural network 208. The fully-connected neural network of the coactivity classification neural network 258 includes one or more hidden layers, each having a relu activation function, followed by the final output layer having the softmax activation function for generating the classification information 210.

In some embodiments, a system 10 or 50 may be configured to further identify and encode additional key points detected within the image 12 or within one or more of the frames 52A through 52B. For example, one or more key points of an additional object detected within an image 12 may also be processed to generate the encoded representation 24. Examples of such additional object key points and their inclusion in the operations described above will be described below with reference to FIGS. 5 and 8.

Figure 3:
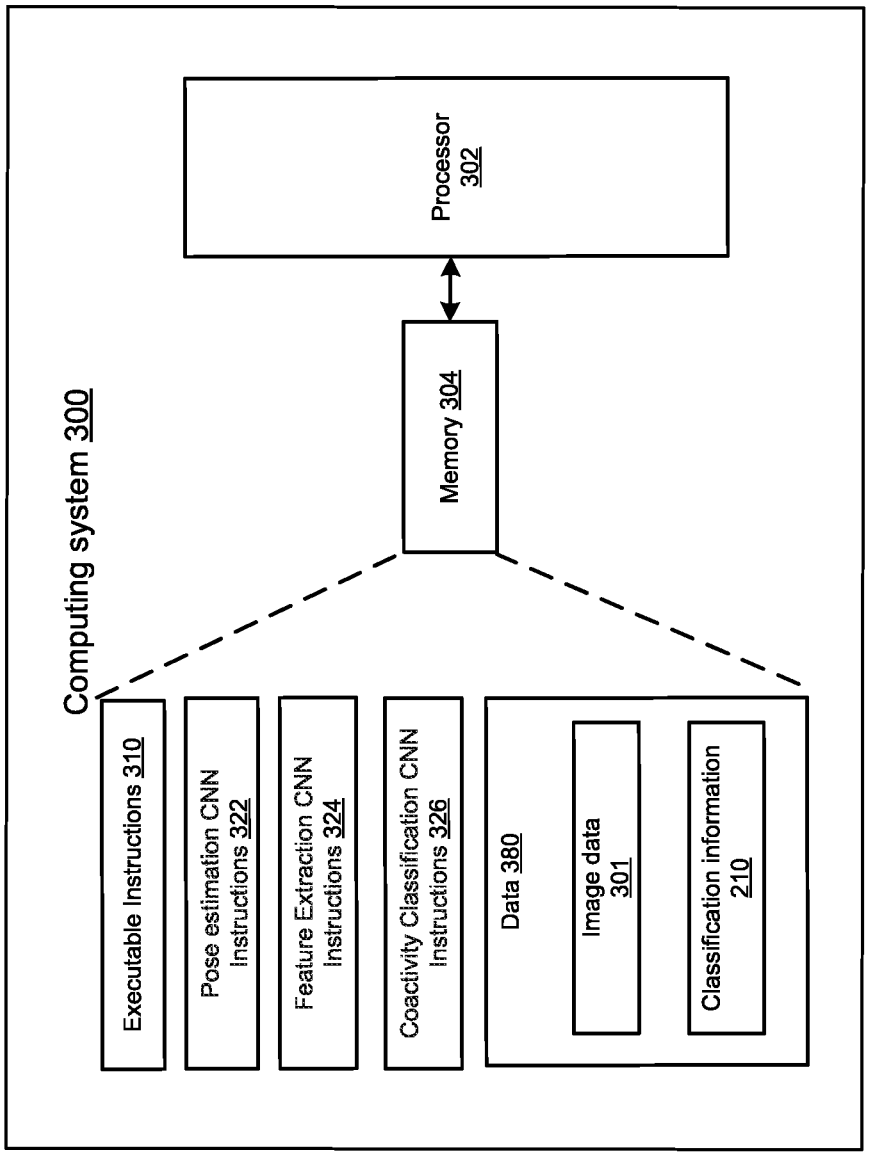
FIG. 3 is a block diagram of an example computing system for classifying coactivity in one or more images according to the first example system of FIG. 1A or the second example system of FIG. 1B.

FIG. 3 shows a block diagram of a computing system 300 for implementing one or more of the example systems 10, 50 described above with reference to FIGS. 1A-2B. The computing system 300 includes a processor 302 for executing computer program instructions, and a memory 304 for storing executable instructions and data.

The processor 302 may be embodied as any processing resource capable of executing computer program instructions, such as one or more processors on a computer or computing platform(s). The memory 304 may be embodied as any data storage resource, such as one or more disk drives, random access memory, or volatile or non-volatile memory on one or more computing platforms. It will be appreciated that, in some embodiments, the computing system 300 may be a distributed computing system implemented over two or more separate hardware platforms in remote communication with each other.

The memory 304 has stored thereon several types of computer programs in the form of executable instructions. It has thereon a set of executable instructions 310 for one or more of the systems, such as example systems 10 and 50, configured to perform the methods described herein. It also has stored thereon one or more sets of instructions of trained neural networks or other machine learned models to identify key points in frames (e.g., a trained CNN used by the pose estimation blocks 18 and 19) and/or to classify human coactivity based on encoded representations (e.g., feature extraction neural network 206 and coactivity classification neural network 208), shown here as pose estimation neural network instructions 322, feature extraction neural network instructions 324, and coactivity classification neural network instructions 326 respectively.

The memory 304 may have stored thereon several types of data 380. The data 380 may include image data 301 representative of the image 12 or of the sequence of frames 52A through 52B. In some embodiments, the image data 301 may be received from an external source via a communication system (not shown), potentially being stored in part in a buffer or cache in the memory 304. The memory 304 may also have stored thereon the classification information 210 generated by the system 10, 50. The memory 304 may also store, temporarily or otherwise, the various types of intermediate information or data (not shown) used by the system 10, 50, such as the encoded representations 24 and/or 54, the first and second key points position sets 20, 22, etc.

Figure 4B:
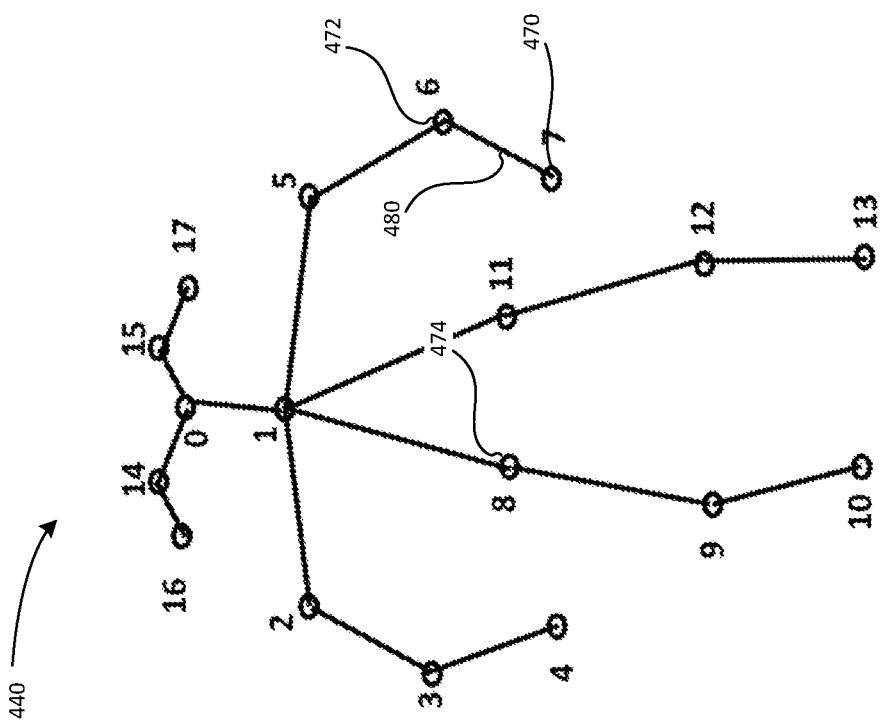
FIG. 4B is a visual representation of a plurality of key point coordinates as identified in the example image shown in FIG. 4A by example embodiments described herein.
Figure 4A:
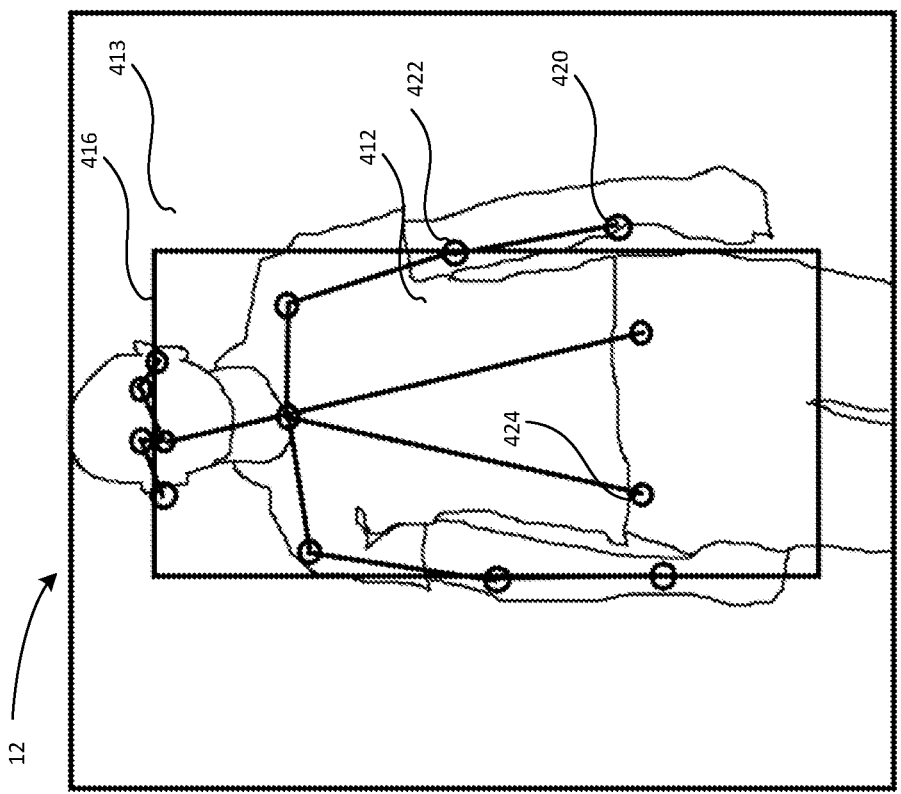
FIG. 4A is an example of an image showing key points superimposed on an image of a human body by example embodiments described herein.

FIG. 4A shows an example image 12 that includes a bounding box 416 generated for a human body 412 detected in the image 12 and the key points identified for the human body overlaid on the image. The image 12 shows the human body 412 against a background 413. Key points identified in the image 12 by the pose estimation block 18, 19 are shown as dots, such as a right hip key point 424, a left elbow key point 422, and a left wrist key point 420. In the image 12 shown in FIG. 4A, the bounding box 416 is shown as a rectangular box overlaid on the image 12 that encompasses the torso of the human body 412 i.e. the shoulder key points, neck key point, and hip key points.

FIG. 4B shows an example key point skeleton 440 with identified key points corresponding to positions on a human body. In this example, each key point on the skeleton 440 is assigned a unique identifier in the form of an index number, from #1 to #17. Most of the key points (e.g. key points assigned index numbers #0 through #13) correspond to joints of the skeleton 440, while a few key points (key points assigned index numbers #0 and #14 through #17) correspond to fixed locations on the head, such as eyes, nose, and ears. For example, index number #8 corresponds to the right hip, and is shown in FIG. 4A as right hip key point 424 and right hip key point 474 in FIG. 4B. Index number #7 corresponds to the left wrist, and is shown as left wrist key point 420 in FIG. 4A and left wrist key point 470 in FIG. 4B. Left wrist key point 570 in FIG. 4B is marked with an index number "7". Index number #6 corresponds to the left elbow, and is shown as left elbow key point 422 in FIG. 4A and left elbow key point 472 in FIG. 4B. Left elbow key point 472 is marked with the index number "6". Various body parts may be identified on the skeleton 440 as the segments extending between two adjacent joints, such as left lower arm 480 between the left wrist key point 470 corresponding to index number #7 and the left elbow key point 472 corresponding to index number #6.

The key points shown in FIG. 4B are listed in the table below with their respective index numbers:

| Index Number | Body Location |
| --- | --- |
| #0 | Nose |
| #1 | Neck |
| #2 | Right Shoulder |
| #3 | Right Elbow |
| #4 | Right Wrist |
| #5 | Left Shoulder |
| #6 | Left Elbow |
| #7 | Left Wrist |
| #8 | Right Hip |
| #9 | Right Knee |
| #10 | Right Ankle |
| #11 | Left Hip |
| #12 | Left Knee |
| #13 | Left Ankle |
| #14 | Right Eye |
| #15 | Left Eye |
| #16 | Right Ear |
| #17 | Left Ear |

A key point position includes (x,y) or (x,y,z) pixel coordinates of a key point with respect to the coordinate system of a frame. Thus, assuming the lower left corner of the image 12 has pixel coordinates (0,0), the key point 474 corresponding to index number #8 (shown as right hip key point 424 in FIG. 4A) might have pixel coordinates (100,80), and the key point position for key point 472 corresponding to index number #6 (shown as left elbow key point 422 in FIG. 4A), might have pixel coordinates (190,170). As the knees and ankles of the body 412 are not visible within the image 12, the knee key points (corresponding to index numbers #9 and #12) and the ankle key points (corresponding to index numbers #10 and #13) are not identified by the pose estimation block 18, 19 and are not shown as dots overlaid within the image 12.

Figure 5:
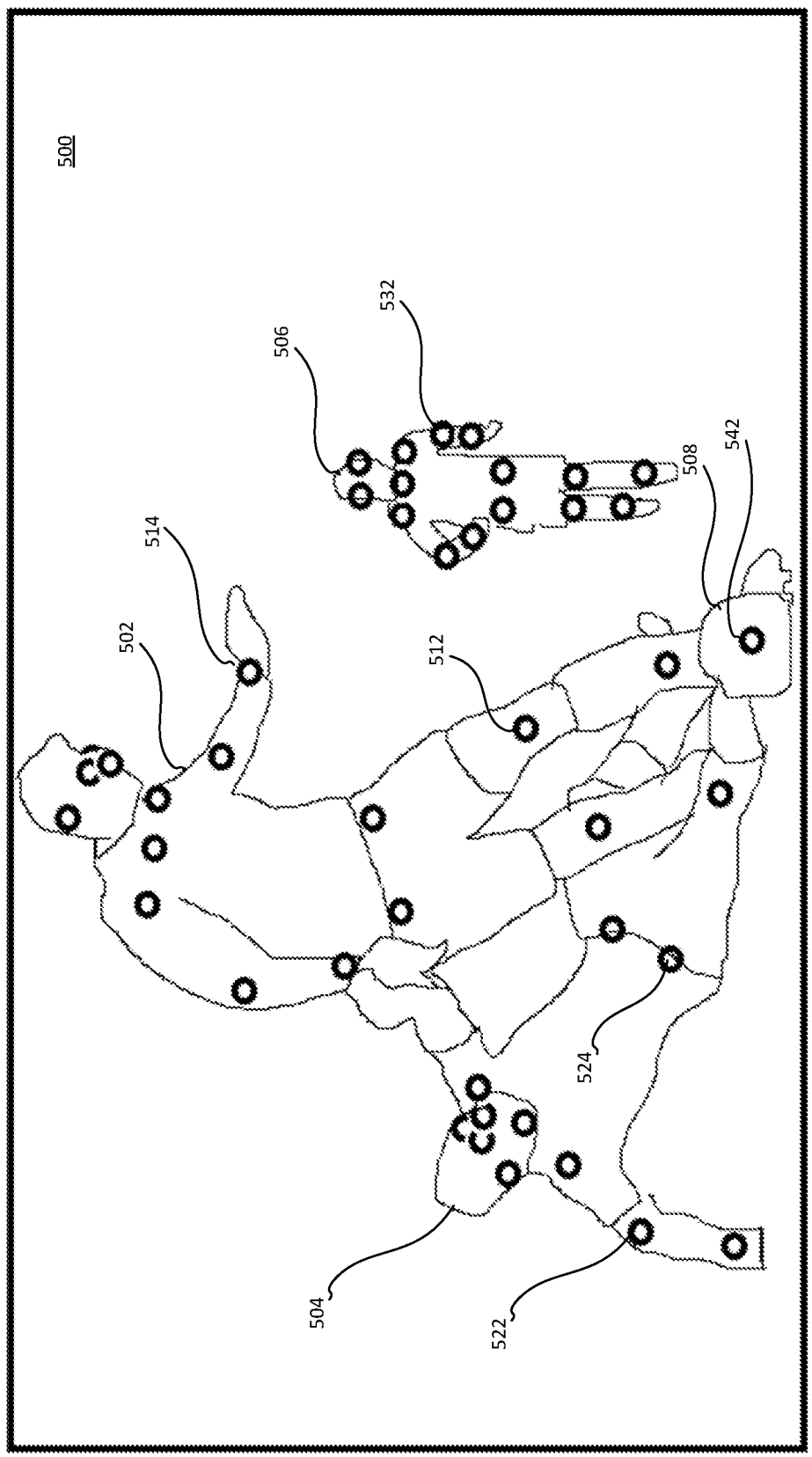
FIG. 5 is an example of an image showing key points superimposed on an image of three human bodies by example embodiments described herein, wherein two of the human bodies are engaged in a coactivity.

FIG. 5 shows an example image 500 in which three human bodies 502, 504, 506 and a soccer ball 508 are visible. The image 500 shows key points identified for each of the human bodies 502, 504, 506 and the soccer ball 508. Bounding boxes are not shown, but in some embodiments may be generated prior to identifying the key point positions, as described above. For example, the image may be processed by an object detection model to generate bounding boxes for each human body 502, 504, 506 and the soccer ball 508 prior to identifying the key points shown in the image 500.

Example systems and methods described herein may be used to process key points of the first human body 502 and second human body 504 to classify a human coactivity being jointly performed thereby. For example, system 10 may use a coactivity classifier 26 trained to generate classification information 210 classifying the coactivity of the first and second human bodies 502, 504 among a set of coactivity classes {"foul", "not foul"} indicating whether or not a foul play is being performed in the depicted soccer game. In some embodiments, the third human body 506 may be omitted from processing by the system 10, for example based on the relative proximities of each of the human bodies 502, 504, 506. In other embodiments, each pair of human bodies (502 and 504, 502 and 506, 504 and 506) may be provided separately to the system 10 for coactivity classification.

The first key point position set 20 may be generated with respect to the first human body 502, encompassing all of the visible key points of the first human body 502, such as left wrist key point 514 and left knee key point 512. The second key point position set 22 may be generated with respect to the second human body 504, encompassing all of the visible key points of the second human body 504, such as right elbow key point 522 and right hip key point 524.

In some examples, further described below with reference to the method of FIG. 8, an object in the image 500 (such as the soccer ball 508) may be identified and assigned one or more key points, for example by an object detection model. In image 500, the soccer ball 508 has a single key point 542, located approximately at the center of the soccer ball 508.

Figure 6:
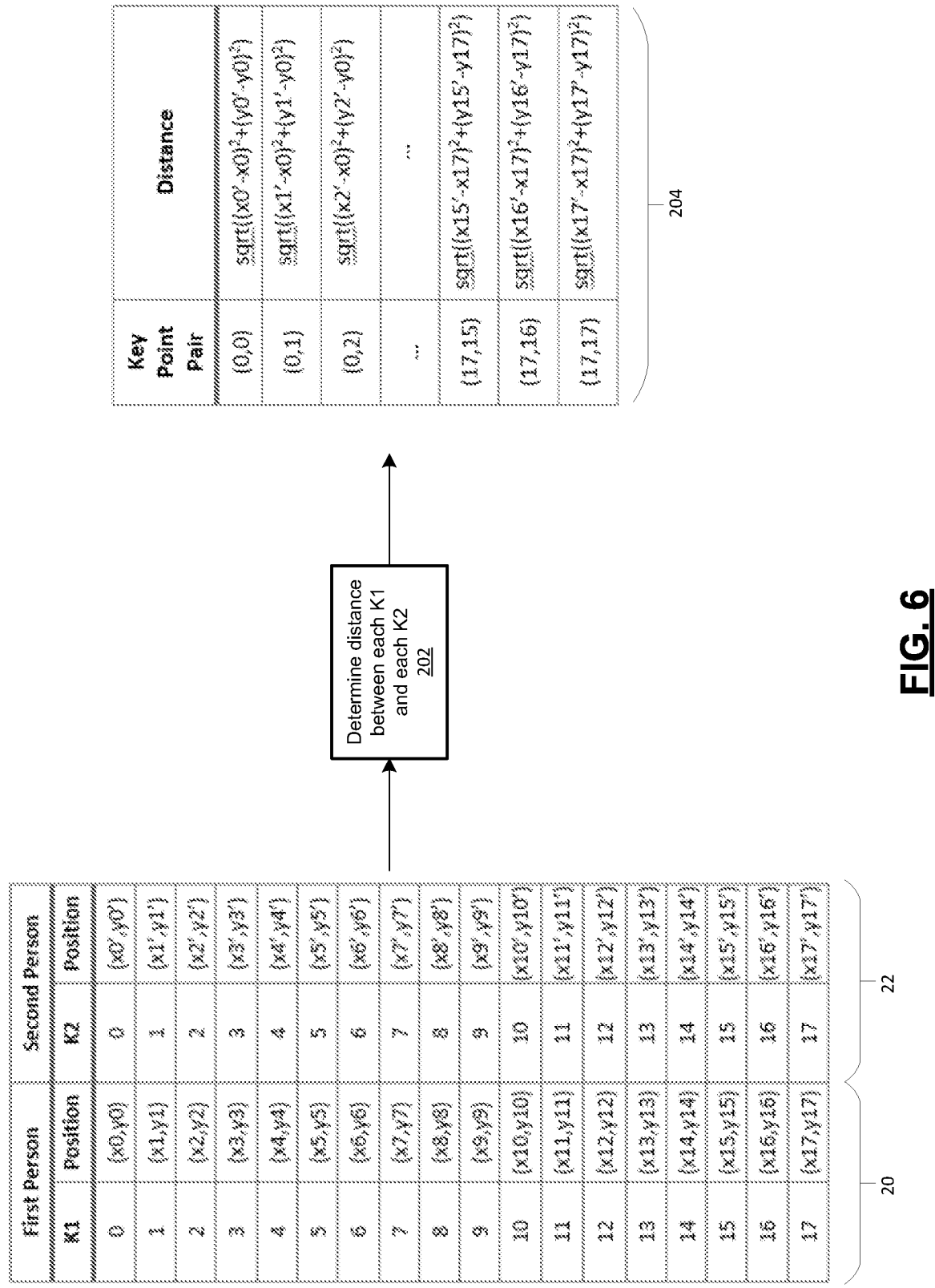
FIG. 6 shows example data representations of the first key point position set, second key point position set, and encoded representation of FIG. 2A.

FIG. 6 shows an example of how the first key point position set 20 and second key point position set 22 are processed using the distance computation operation 202 to generate the distance vector 204 of the encoded representation 24. The first key point position set 20 and second key point position set 22 each include 18 key points positions, denoted by their respective key point identifiers (i.e. index numbers 0 through 17, as described above, denoted as K1(0) through K1(17) for the first key point position set 20 and as K2(0) through K2(17) for the second key point position set 22) and represented as 2D coordinate sets. For example, key point position K1(15) has position K1(15)=(x15,y15), whereas key point position K2(7) has position K2(7)=(x7', y7'). It will be appreciated that the encodings shown in FIG. 6 can be extended to 3D coordinates as described above.

As described above, the distance computation operation 202 computes a distance between each key point of the first key point position set 20 and each key point of the second key point position set 22 to generate the distance vector 204. Thus, the first element of the distance vector 204, denoted as Key Point Pair (0,0), is shown as a distance value computed between key point K1(0) (i.e., the nose key point, having index number 0, from the first key point position set 20) and key point K2(0) (i.e., the nose key point, having index number 0, from the second key point position set 22). The distance value of this first element is computed as sqrt((x0'-x0)$^2$+(y0'-y0)$^2$), i.e. the square root of the sum of the squares of the differences in x and y values of the pair of key points K1(0) and K2(0). The second element of the distance vector 204 is shown as a distance value computed between key point K1(0) (i.e., the nose key point, having index number 0, from the first key point position set 20) and key point K2(1) (i.e., the neck key point, having index number 1, from the second key point position set 22). The distance value of this second element is computed as sqrt((x1'-x0)$^2$+(y1'-y0)$^2$). The distance vector 204 thus includes 324 separate elements, each corresponding to a distance value between each pair of (K1,K2) positions, from (K1(0),K2(0)) to (K1(17),K2(17)). For example, the distance vector 204 for image 500 in FIG. 5 would include an element denoted by "(12,3)" corresponding to key point pair (K1(12),K2(3)), i.e., the distance between the left knee key point 512 of the first human body 502 and the right elbow key point 522 of the second human body 504.

Figure 7:
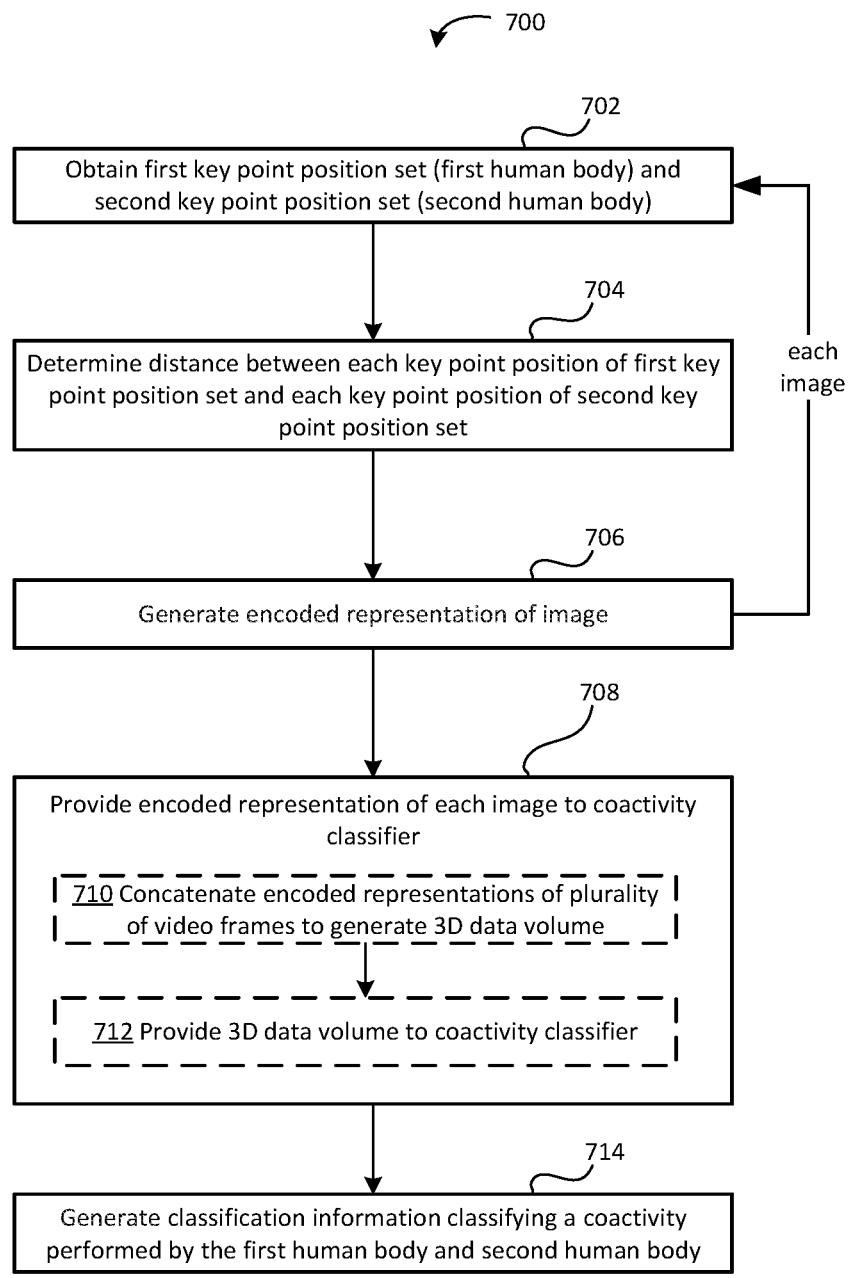
FIG. 7 is a flowchart of a first example method for classifying human coactivity in one or more images according to example embodiments described herein.

FIG. 7 shows a flowchart of a method 700 for classification of human coactivity in a single image 12 or in a sequence of video frames 52A through 52B. The method 700 will be described with reference to system 10, 50 described above, as implemented by computing system 300. However, it will be appreciated that the steps of the method 700 may be performed using other means in some embodiments.

Steps 702, 704, and 706 are performed for each image of one or more images (e.g., for single image 12, or for each frame of frames 52A through 52B). At 702, the system (e.g., system 10) obtains the first key point position set 20 and the second key point position set 22 for the image (e.g., image 12), as described above. The first key point position set including a key point position for each key point of a plurality of key points of a first human body detected in the image, and the second key point position set including a key point position for each key point of a plurality of key points of a second human body detected in the image. A detailed example implementation of step 702 is described below with reference to FIG. 9.

At 704, the encoded representation generation block (e.g., 23 or 53) processes the first key point position set 20 and the second key point position set 22 to determine a distance between each key point position of the first key point position set 20 and each key point position of the second key point position set 22, for example using the distance computation operation 202 described above.

At 706, the encoded representation generation block (e.g., 23 or 53) processes the distance between each key point position of the first key point position set and each key point position of the second key point position set to generate an encoded representation of the image (e.g., distance vector 204 included in encoded representation 24).

After the encoded representations (e.g., distance vectors 204) have been generated for each image of the one or more images, the method 700 proceeds to step 708.

At 708, the encoded representation generation block (e.g., 23 or 53) provides the encoded representation of each image of the one or more images to a coactivity classifier (e.g., 26 or 56).

In some examples, optionally, step 708 includes sub-steps 710 and 712 for systems such as second example system 50 configured to process sequences of video frames. At 710, the encoded representations (e.g., distance vectors 204) for the plurality of video frames 52A through 52B are concatenated or otherwise combined to generate a 3D data volume 254. At 712, the 3D data volume 254 is provided as input to the coactivity classifier 56 (e.g., as part of combined encoded representation 54). The 3D data volume 254 may be provided as a 3D data volume or as a flattened linear vector, as described above.

At 714, the coactivity classifier (e.g., 26 or 56) generates classification information 210 classifying a coactivity performed by the first human body (e.g., 502) and second human body (e.g., 504) in the one or more images (e.g., image 500).

Figure 8:
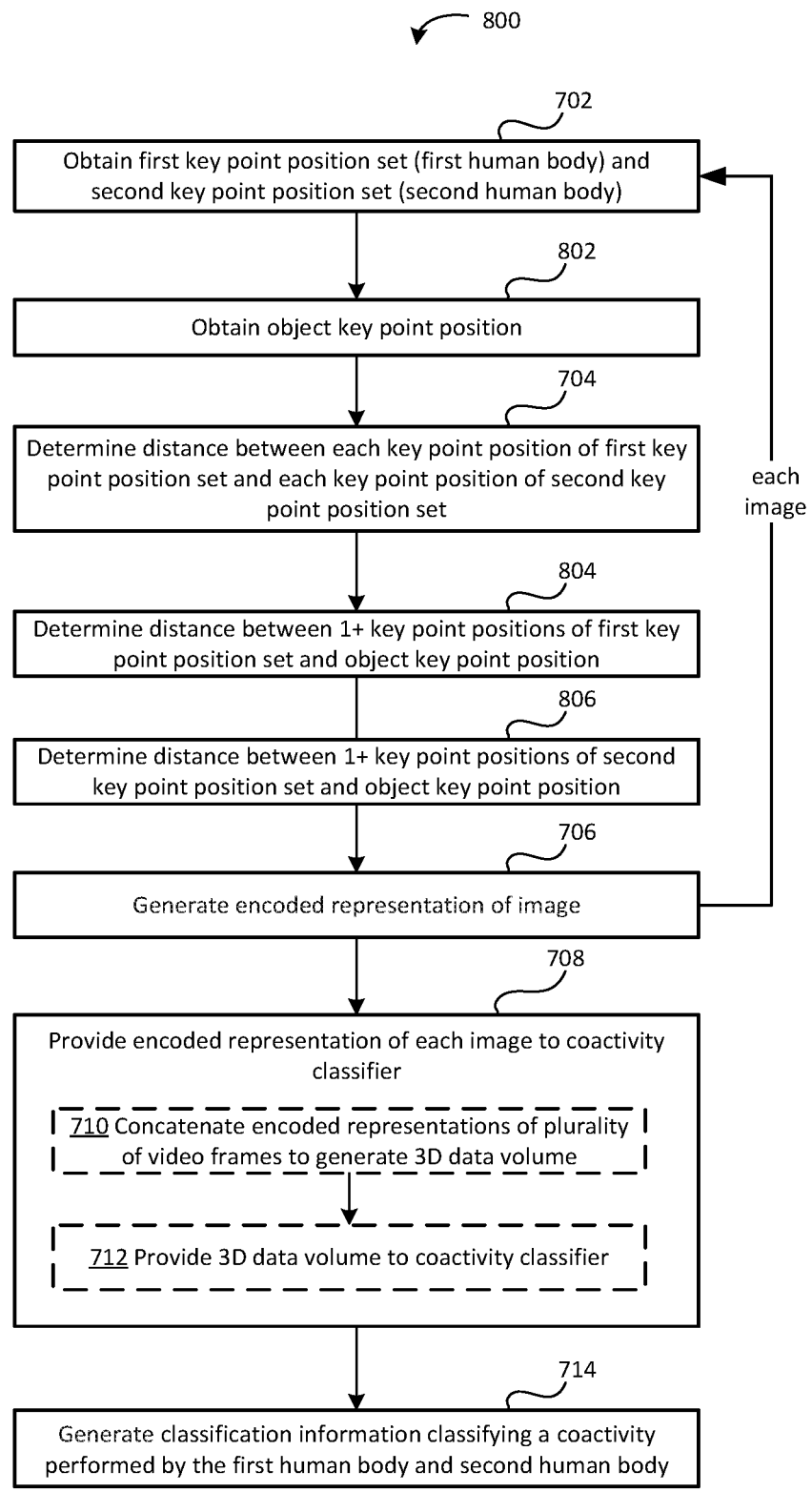
FIG. 8 is a flowchart of a second example method for classifying human coactivity involving an object in one or more images according to example embodiments described herein.

FIG. 8 shows steps of a second example method 800 for classifying human coactivity, involving an object, in one or more images. Method 800 includes a number of steps that are identical to those of method 700 and are numbered identically. However, method 800 also includes steps for taking into account one or more object key points in performing the human coactivity classification.

Step 702 is as described above with reference to method 700. Step 702 is followed by step 802. At 802, an object key point position for the image is obtained, such as object key point 542 in image 500. The object key point position is representative of a position of a key point of an object (e.g., soccer ball 508) detected in the image.

Step 704 is as described above with reference to method 700. Step 704 is followed by steps 804 and 806. At 804, the first key point position set 20 and the object key point position (e.g., the position of object key point 542) are processed to determine a distance between each at least one key point position of the first key point position set 20 and the object key point position. At 806, the second key point position set 22 and the object key point position (e.g., the position of object key point 542) are processed to determine a distance between each at least one key point position of the second key point position set and the object key point position. In some examples, steps 804 and 806 may be performed by a modified version of the distance computation operation 202 that additionally computes distances from object key point 542 to one or more of the key point positions of the first key point position set 20 and the second key point position set 22.

Steps 706, 708, and 714 are as described above with reference to method 700. In systems implementing method 800, the coactivity classifier 26, 56 is trained using encoded representations that include distance vectors having object key point distance data as generated at steps 804 and 806.

Figure 9:
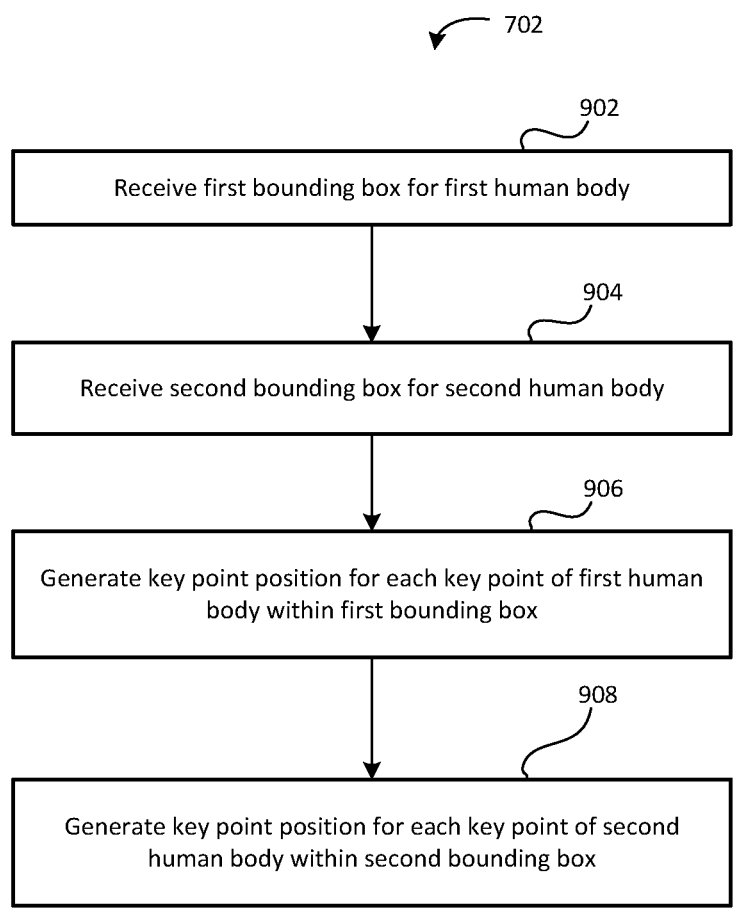
FIG. 9 is a flowchart of an example method for obtaining the first key point position set and second key point position set according to the first step of the method of FIG. 7.

FIG. 9 shows steps of a detailed example implementation of step 702 of method 700 in which the first key point position set 20 and the second key point position set 22 are obtained using a pose estimation model (e.g., a trained 2D pose estimation CNN used by pose estimation blocks 18, 19).

At 902, the first pose estimation block 18 receives a first bounding box for the first human body 502, comprising one or more pixel values of a first plurality of pixels of the respective image 500.

At 904, the second pose estimation block 19 receives a second bounding box for the second human body 504, comprising one or more pixel values of a second plurality of pixels of the respective image 500.

At 906, the first pose estimation block 18 processes the first bounding box to generate the key point position for each key point of the plurality of key points of the first human body 502 within the first bounding box (i.e., the first pose estimation block 18 generates the first key point position set 20).

At 908, the second pose estimation block 19 processes the second bounding box to generate the key point position for each key point of the plurality of key points of the second human body 504 within the second bounding box (i.e., the second pose estimation block 19 generates the second key point position set 22).

It will be appreciated that the methods and systems described herein may be applied, in some embodiments, to identification of the coactivity of objects other than human bodies, given appropriate training of the neural networks used to identify key points and the neural networks used to classify coactivity. In further example embodiments, coactivity of anthropomorphic characters or animal bodies could be identified by training the neural networks or other models with suitable training data. In other embodiments, key points could be mapped to moving parts of any system shown in images: for example, vehicles or parts of vehicles.

As described above, some embodiments may process more than one pair of human bodies detected within an image, such as each pair of human bodies detected within the image, to classify coactivities as between multiple pairs of human bodies shown in the image. In some further example embodiments, the described systems and methods may be configured to compute distances between keys points of more than two sets of key point positions corresponding to more than two human bodies, and to process the resulting encoded representations to classify coactivities of more than two human bodies. These techniques may, in some examples, be combined with the use of object key points, identification of non-human bodies, and other alternative techniques described above, to classify coactivities of multiple human or non-human objects by means of generating a distance vector and processing said distance vector with a trained neural network or other model according to the principles described herein.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method, comprising:
for each image of one or more images:
obtaining a first key point position set and a second key point position set for the image;
the first key point position set including a key point position for each key point of a plurality of key points of a first human body detected in the image; and
the second key point position set including a key point position for each key point of a plurality of key points of a second human body detected in the image;
processing the first key point position set and the second key point position set to determine a distance between each key point position of the first key point position set and each key point position of the second key point position set, wherein the distance between each key point position of the first key point position set and all of the key point positions of the second key point position set is determined; and
processing the distances between each key point position of the first key point position set and each key point position of the second key point position set to generate an encoded representation of the image;
providing the encoded representation of each image of the one or more images to a coactivity classifier that includes a machine learned model that is configured to classify a coactivity of two human bodies; and
generating classification information, using the coactivity classifier, classifying a coactivity performed by the first human body and second human body in the one or more images.

2. The method of claim 1, wherein:
the one or more images comprises a plurality of frames of a video; and
providing the encoded representation of each image of the one or more images to the coactivity classifier comprises:
concatenating the encoded representations of the plurality of frames to generate a three-dimensional (3D) data volume; and providing the 3D data volume as input to the coactivity classifier.

3. The method of claim 1, wherein:

the one or more images comprises a single image; and the encoded representation of each image of the one or more images comprises a vector of values, each value being based on the distance between each key point position of the first key point position set and each key point position of the second key point position set.

4. The method of claim 1, wherein:

each key point position is a two-dimensional (2D) position within a plane of the respective image; and each distance is a 2D distance within an image plane of the respective image.

5. The method of claim 1, wherein:

each key point position is a three-dimensional (3D) position representative of a location of the respective key point in 3D space; and each distance is a 3D distance.

6. The method of claim 1, further comprising:

for each image of the one or more images:

obtaining an object key point position for the image, the object key point position being representative of a position of a key point of an object detected in the image;

processing the first key point position set and the object key point position to determine a distance between each at least one key point position of the first key point position set and the object key point position; and processing the second key point position set and the object key point position to determine a distance between each at least one key point position of the second key point position set and the object key point position;

wherein:

for each image of the one or more images, the encoded representation of the image is further generated by processing:

the distance between each at least one key point position of the first key point position set and the object key point position; and the distance between each at least one key point position of the second key point position set and the object key point position.

7. The method of claim 1, wherein obtaining the first key point position set and the second key point position set for the image comprises:

generating the first key point position set and the second key point position set using a pose estimation model configured to:

receive a first bounding box for the first human body, comprising one or more pixel values of a first plurality of pixels of the respective image;

receive a second bounding box for the second human body, comprising one or more pixel values of a second plurality of pixels of the respective image;

process the first bounding box to generate the key point position for each key point of the plurality of key points of the first human body within the first bounding box; and process the second bounding box to generate the key point position for each key point of the plurality of key points of the second human body within the second bounding box.

8. The method of claim 1, wherein the machine learned model comprises a fully-connected neural network.

9. The method of claim 1, wherein:

at least one key point position of the first key point position set corresponds to a joint of the first human body; and at least one key point position of the second key point position set corresponds to a joint of the second human body.

10. The method of claim 1, wherein the encoded representation of each respective image comprises a vector comprising a plurality of distance values, the plurality of distance values comprising the distance between each key point position of the first key point position set and each key point position of the second key point position set of the respective image.

11. A system, comprising:

a processor; and a non-transitory memory having stored thereon executable instructions that, when executed by the processor, cause the system to:

for each image of one or more images:

obtain a first key point position set and a second key point position set for the image;

the first key point position set including a key point position for each key point of a plurality of key points of a first human body detected in the image; and the second key point position set including a key point position for each key point of a plurality of key points of a second human body detected in the image;

process the first key point position set and the second key point position set to determine a distance between each key point position of the first key point position set and each key point position of the second key point position set, wherein the distance between each key point position of the first key point position set and all of the key point positions of the second key point position set is determined; and process the distances between each key point position of the first key point position set and each key point position of the second key point position set to generate an encoded representation of the image;

provide the encoded representation of each image of the one or more images to a coactivity classifier that includes a machine learned model that is configured to classify a coactivity of two human bodies; and generate classification information, using the coactivity classifier, classifying a coactivity performed by the first human body and second human body in the one or more images.

12. The system of claim 11, wherein:

the one or more images comprises a plurality of frames of a video; and providing the encoded representation of each image of the one or more images to the coactivity classifier comprises:

concatenating the encoded representations of the plurality of frames to generate a three-dimensional (3D) data volume; and providing the 3D data volume as input to the coactivity classifier.

13. The system of claim 11, wherein:
the one or more images comprises a single image; and
the encoded representation of each image of the one or more images comprises a vector of values, each value being based on the distance between each key point position of the first key point position set and each key point position of the second key point position set.

14. The system of claim 11, wherein:
each key point position is a two-dimensional (2D) position within a plane of the respective image; and
each distance is a 2D distance within an image plane of the respective image.

15. The system of claim 11, wherein:
each key point position is a three-dimensional (3D) position representative of a location of the respective key point in 3D space; and
each distance is a 3D distance.

16. The system of claim 11, wherein:
the instructions, when executed by the processor, further cause the system to:
for each image of the one or more images:
obtain an object key point position for the image, the object key point position being representative of a position of a key point of an object detected in the image;
process the first key point position set and the object key point position to determine a distance between each at least one key point position of the first key point position set and the object key point position; and
process the second key point position set and the object key point position to determine a distance between each at least one key point position of the second key point position set and the object key point position; and
for each image of the one or more images, the encoded representation of the image is further generated by processing:
the distance between each at least one key point position of the first key point position set and the object key point position; and
the distance between each at least one key point position of the second key point position set and the object key point position.

17. The system of claim 11, wherein obtaining the first key point position set and the second key point position set for the image comprises:
generating the first key point position set and the second key point position set using a pose estimation model configured to:
receive a first bounding box for the first human body, comprising one or more pixel values of a first plurality of pixels of the respective image;
receive a second bounding box for the second human body, comprising one or more pixel values of a second plurality of pixels of the respective image;
process the first bounding box to generate the key point position for each key point of the plurality of key points of the first human body within the first bounding box; and
process the second bounding box to generate the key point position for each key point of the plurality of key points of the second human body within the second bounding box.

18. The system of claim 11, wherein the machine learned model comprises a fully-connected neural network.

19. The system of claim 11, wherein the encoded representation of each respective image comprises a vector comprising a plurality of distance values, the plurality of distance values comprising the distance between each key point position of the first key point position set and each key point position of the second key point position set of the respective image.

20. A non-transitory processor-readable medium containing instructions which, when executed by a processor of a system, cause the system to:
for each image of one or more images:
obtain a first key point position set and a second key point position set for the image;
the first key point position set including a key point position for each key point of a plurality of key points of a first human body detected in the image; and
the second key point position set including a key point position for each key point of a plurality of key points of a second human body detected in the image;
process the first key point position set and the second key point position set to determine a distance between each key point position of the first key point position set and each key point position of the second key point position set, wherein the distance between each key point position of the first key point position set and all of the key point positions of the second key point position set is determined; and
process the distances between each key point position of the first key point position set and each key point position of the second key point position set to generate an encoded representation of the image;
provide the encoded representation of each image of the one or more images to a coactivity classifier that includes a machine learned model that is configured to classify a coactivity of two human bodies; and
generate classification information, using the coactivity classifier, classifying a coactivity performed by the first human body and second human body in the one or more images.

* * * * *